United States Patent Office 3,553,106
Patented Jan. 5, 1971

3,553,106
CATALYTIC REMOVAL OF VANADIUM AND NICKEL FROM OILS
Harry A. Hamilton, Natrona Heights, Howard G. McIlvried, Pittsburgh, and Raynor T. Sebulsky, O'Hara Township, Allegheny County, Pa., assignors to Gulf Research & Development Company, Pittsburgh, Pa., a corporation of Delaware
No Drawing. Filed June 28, 1968, Ser. No. 741,232
Int. Cl. C10g 17/00, 23/00
U.S. Cl. 208—251    8 Claims

ABSTRACT OF THE DISCLOSURE

Vanadium and nickel are removed from petroleum oils by contact with a preformed vanadium oxide catalyst on activated alumina in the presence of hydrogen. The catalyst is prepared by contacting activated alumina with a non-oily medium containing a soluble vanadium compound.

---

This invention relates to the removal of vanadium and nickel from hydrocarbons. More particularly, this invention relates to the removal of vanadium from petroleum oils employing a novel solid catalytic material.

Many crude petroleum oils and the higher boiling distillates and reduced crudes derived therefrom contain vanadium, along with other trace metals, as an impurity in amounts which range from about a part per million up to 500 parts per million or more. The vanadium appears to occur at least in substantial part in the form of oil-soluble complexes, such as porphyrin compounds, some of which are volatile and may be carried over into distillates. Most vanadium compounds, however, are non-volatile and remain in the reduced crudes or residues.

The presence of vanadium in crude petroleum oils is objectionable in that it tends to deposit upon catalysts employed in the treatment of vanadium-containing fractions of oils whereby such catalysts are rendered less suitable for further treating. It has been found that even a relatively small amount, i.e., a few parts per million, of vanadium contamination in the oil fed to a catalytic conversion process can substantially alter the selectivity of the catalyst. A loss in catalyst selectivity in cracking processes due to the presence of an objectionable amount of vanadium is highly undesirable, since the catalyst will tend to promote the formation of relatively smaller proportions of hydrocarbons boiling in the desired gasoline range, and relatively greater proportions of gas and coke from a given charge stock for a given degree of conversion. Greater coke production, in turn, tends to restrict cracking capacity.

In addition to the presence of vanadium being objectionable in connection with cracking catalysts, its presence is also very damaging to catalysts in other types of processes, particularly hydrogenation catalysts. For example, vanadium is quite detrimental to catalysts employed in hydrodesulfurization processes. Shortened process cycle life is caused by the deposition of vanadium on the catalyst which reduces desulfurization activity, thereby requiring more frequent regeneration of the hydrodesulfurization catalyst. However, since regeneration does not remove the vanadium deposit but only carbonaceous material, each succeeding processing cycle is considerably shorter than the first so that it is soon necessary to discard the catalyst and replace it with fresh catalyst. In severe cases, only one cycle may be possible due to the high buildup of vanadium on the catalyst, so that catalyst usage and costs tend to be high when vanadium is present in the feed. Also, what has been said of vanadium is generally applicable in greater or lesser degree to other heavy metals such as nickel. These examples make clear the advantages to be gained by the removal of vanadium from petroleum feed stocks. In one case, improved catalyst selectivity can be achieved. In another case, considerably longer process cycles are possible with improved catalyst regenerability.

It has been proposed to remove vanadium from petroleum hydrocarbons by contacting the impurities-containing hydrocarbons at elevated temperature and pressure in the presence of hydrogen and a catalyts comprising, nickel, cobalt and molybdenum. The catalysts of this type are relatively expensive and attempts have been made to find less expensive materials for the removal of vanadium and nickel from petroleum oils. Materials such as bauxite, which is an impure, naturally occurring alumina, have been proposed for this purpose. A catalyst for the removal of vanadium which has an even higher activity and capacity for vanadium than materials previously used would be highly desirable.

It has been found that vanadium and nickel can be removed from petroleum feedstocks by a process which comprises contacting such hydrocarbon feedstocks in the presence of hydrogen with a preformed catalyst comprising vanadium upon activated alumina. Surprisingly it has been discovered that the employment of a preformed vanadium on alumina catalyst has a higher capacity for vanadium removal than those of the more expensive nickel-cobalt-molybdenum catalysts heretofore employed for this purpose. Moreover, as will be hereinafter shown, the preformed vanadium on activated alumina catalyst of the present invention is surprisingly more active for removing vanadium impurities from hydrocarbon oil than is initially vanadium-free alumina upon which vanadium deposits in situ.

The preformed vanadium on activated alumina catalyst of the present invention is produced by a process which comprises contacting activated alumina with a non-oily, non-hydrocarbon or polar medium containing a soluble vanadium compound. As used herein and in the appended claims the expression "preformed vanadium on activated alumina catalyst" means a catalyst which is prepared according to the procedures described herein. The term "non-oily" as employed herein is intended to include media, such as aqueous solutions, alcoholic solutions, and the like. Examples of soluble vanadium compounds include vanadium oxalate, vanadyl acetyl acetonate (2,4-pentanedione vanadium), and the like.

Suitable activated aluminas include gamma alumina, eta, alumina, chi alumina and mixtures thereof. Suitable activated aluminas include those prepared by the controlled calcination of various alumina hydrates. For example, the alumina hydrates such as bayerite, boehmite, and gibbsite, may be calcined to produce eta alumina, gamma alumina, and chi alumina, respectively. The activated aluminas suitable for use of the present invention are characterized by a relatively high surface area, which for example, may be in the range of between about 40 and about 400 square meters per gram or higher. An especially preferred activated alumina for use in the present invention is an activated alumina comprising major amounts of gamma and eta aluminas.

Suitable amounts of vanadium include between about 0.01 and about 10 percent by weight vanadium based on the activated alumina, preferably between about 0.5 and about 5.0 percent by weight vanadium on alumina. An especially preferred catalyst for use in the process of the present invention comprises about one to about three percent vanadium on alumina.

More specifically, the catalyst of the present invention may be prepared by a process comprising the steps which include:

(1) Formation of a non-oily or polar solution of the soluble vanadium compound;

(2) Calcination and cooling of the activated alumina;

(3) Contacting the activated alumina with the non-oily medium containing the soluble vanadium compound to impregnate the alumina with the vanadium compound;

(4) Drying the vanadium-impregnated activated alumina; and (5) Calcination of the impregnated catalyst to decompose the vanadium compound and form vanadium oxide in an active state.

The degree of vanadium and nickel removal from petroleum hydrocarbon feedstocks will depend upon the particular feedstock, pressure, temperature and space velocity employed. Suitable demetalization temperatures include those in the range of between about 700° and 1000° F., preferably between 750° and 850° F. Pressures in the range of between about 200 and 5000 p.s.i.g., preferably between about 500 and 2000 p.s.i.g. may be employed. Liquid hourly space velocities including those in the range of between about 0.1 and 10, preferably between about 0.5 and 4, may be utilized. The hydrogen rate may be suitably between about 500 and about 20,000 standard cubic feet of hydrogen per barrel of total oil charged, and preferably in the range of between about 2000 and about 5000 standard cubic feet per barrel.

The vanadium on activated alumina catalyst of the present invention is preferably distributed in the form of a fixed bed in a guard chamber unit or in the first section of a catalytic reactor, so as to remove the vanadium and nickel from the feedstock prior to its treatment over the catalyst in the main processing zone, such as a hydrodesulfurization processing zone, which employs more expensive catalysts whose activity and selectivity are thereby protected. The removal of the troublesome vanadium and nickel permits less frequent replacement or regeneration of the hydrodesulfurization catalyst. The vanadium and nickel-contaminated oil is passed through the guard bed or first catalyst stage with hydrogen under conditions such as those previously set forth. In this manner, between about 70 and about 100 percent of the vanadium; up to about 60 percent or more of the nickel; and up to about 50 percent of the sulfur in the hydrocarbon oil can be removed.

Suitable feedstocks which can be treated for removal of vanadium and nickel therefrom include crude petroleum oil, topped crude, crude oil residues, other heavy hydrocarbon fractions and distillates derived therefrom containing such metallic impurities.

The catalyst of the present invention is not only more active for removing vanadium from hydrocarbon oils than are prior catalysts, such as alumina or nickel-cobalt-molybdenum (Ni—Co—Mo), but the present catalyst also has an unexpectedly high capacity for vanadium while at the same time it does not substantially lose activity. The standard nickel-cobalt-molybdenum catalyst becomes substantially deactivated at a vanadium level on the catalyst of about 18 percent by weight. However, the present vanadium-on-activated alumina catalyst has been loaded to a level greater than 30 percent by weight and still retains its activity for vanadium removal from hydrocarbons. In fact, the present catalyst may be loaded with vanadium to such an extent that the loaded catalyst may be treated as vanadium ore for the recovery of vanadium therefrom.

The following examples will serve to illustrate more fully the manner in which the catalyst of the present invention may be prepared and utilized in the removal of vanadium and nickel contaminants from hydrocarbon streams. The percentages are by weight unless otherwise indicated.

An especially preferred means of producing the catalyst of the present invention is illustrated by the following example.

EXAMPLE 1

Twenty-one and one-half grams of oxalic acid are dissolved in 381.1 grams of distilled water which is at a temperature of about 140° F. Vanadium pentoxide in an amount of 8.6 grams is slowly added and dissolved in the oxalic acid solution so as to produce vanadium oxalate. The total weight of the resultant solution is 411.2 grams.

Meanwhile, a commercial grade of activated alumina comprising a mixture of gamma and eta aluminas (Filtrol Grade 86 alumina) is calcined at a temperature of 1000° F. for about 10 hours. After calcination, the activated alumina is allowed to cool to room temperature in a dry atmosphere. Next, 472.8 grams of the calcined, activated alumina are weighed into a 1.5 liter porcelain evaporating dish.

The previously prepared vanadium oxalate solution is then added to the alumina in the evaporating dish and is mixed thoroughly therewith. The dish containing the vanadium oxalate impregnated activated alumina is placed in an oven and is dried overnight at a temperature of 250° F. Finally, the dried catalyst is calcined at a temperature of 1000° F. for about 10 hours resulting in a one percent vanadium on activated alumina catalyst.

An alternative method for making the catalyst is described in the following example.

EXAMPLE 2

The Filtrol Grade 86 activated alumina is prepared as in Example 1 and 298.8 grams are weighed and placed in a one liter Erlenmeyer flask. Meanwhile, 20.8 grams of vanadyl acetyl acetonate (2,4-pentanedione vanadium) are weighed in nitrogen and added to a beaker containing 303.9 grams of isopropyl alcohol. The beaker and its contents are maintained under a nitrogen atmosphere. Next, under a nitrogen atmosphere, the alcoholic vanadyl acetyl acetonate solution is added to and mixed with the calcined alumina in the Erlenmeyer flask. Still under the nitrogen atmosphere, the flask and its contents are heated to 200° F. and held at this temperature overnight. Next, the dried catalyst is transferred under a nitrogen atmosphere to storage bottles.

When it is desired to employ the impregnated catalyst, it is transferred to a reactor under a nitrogen atmosphere. The reactor is pressured to 1500 p.s.i.g. with a stream of hydrogen. The impregnated vanadium compound on the activated alumina support is reduced and decomposed by heating the catalyst bed to a temperature of 300° to 400° F. in a stream of hydrogen for two hours.

The following examples illustrate the employment of the vanadium on active alumina catalyst of the present invention by a comparison with other demetalization catalysts in which the various references to vanadium on alumina or vanadium on activated alumina refer to the catalyst of the present invention unless specifically described otherwise.

EXAMPLES 3 TO 8

A catalyst comprising one percent vanadium on an active alumina which comprises gamma and eta aluminas is contacted with a crude oil containing 120 p.p.m. vanadium, 12 p.p.m. nickel, and 1.11 percent by weight sulfur. The contacting conditions employed include a temperature of 790° F., a pressure of 1800 p.s.i.g., and a liquid hourly space velocity of two. Hydrogen is employed at the rate of 5000 standard cubic feet of hydrogen per barrel of crude oil treated. The run is repeated employing the same conditions except for the temperature which is 825° F. An activated alumina catalyst, per se, and a nickel-cobalt-molybdenum catalyst, respectively, are contacted with crude oil containing the same amounts of vanadium, nickel and sulfur under the identical conditions. The product analyses of these runs are set forth in Table I.

A similar run is made employing activated alumina per se as the demetalization catalyst. Measurements are made at various intervals as the vanadium from the crude

TABLE I

| Example No. | Catalyst | Temp. (° F.) | Vanadium (p.p.m.) | Nickel (p.p.m.) | Sulfur (percent by wt.) |
|---|---|---|---|---|---|
| 3 | 1% V on activated alumina | 790 | 5.1 | 3.4 | 0.90 |
| 4 | 1% V on activated alumina | 825 | <0.1 | 1.0 | 0.65 |
| 5 | NiCoMo [a] | 790 | 30 | 4.6 | 0.10 |
| 6 | NiCoMo [a] | 825 | 19 | 4.4 | 0.10 |
| 7 | Activated alumina | 790 | 12 | 6.3 | 1.11 |
| 8 | Activated alumina | 825 | 0.8 | 1.1 | 0.76 |

[a] 0.6 wt. percent Ni, 1.0% C. and 8.0% Mo on activated alumina.

Upon viewing the results set forth in Table I, it can be seen that the greatest degree of vanadium removal from the crude oil is achieved with the one percent vanadium-impregnated activated alumina catalyst. In Example 4, the vanadium content of the treated crude oil was reduced to less than 0.1 p.p.m. with this catalyst.

The following examples illustrate the high degree of selectivity of the catalyst of the present invention for vanadium removal from hydrocarbons and further shows its advantage over other metals removal catalysts.

EXAMPLES 9–14

For comparative purposes, a nickel-cobalt-molybdenum on activated alumina catalyst is compared with a one percent vanadium-on-activated alumina catalyst for the removal of vanadium from crude oil under various process conditions. The results are set forth in Table II. The vanadium content of the crude oil feedstock for Examples 9, 10 and 11 to 14 is 120 p.p.m., 122 p.p.m., and 160 p.p.m., respectively.

oil becomes deposited on the catalyst. The results of these runs are set forth in Table III.

TABLE III

| Example No. | Throughput [a] | Total vanadium on catalyst (wt. percent) | Product vanadium (p.p.m.) | Vanadium removal (percent) |
|---|---|---|---|---|
| 15 [b] | 23.5 | 1.64 | 26 | 83.8 |
| 16 [b] | 39 | 1.80 | 30 | 81.3 |
| 17 [b] | 59.6 | 2.00 | 28 | 82.5 |
| 18 [b] | 2,638 | .27 | 29 | 81.8 |
| 19 [c] | 38.8 | 0.23 | 63 | 60.6 |
| 20 [c] | 220 | 1.37 | 60 | 62.5 |
| 21 [c] | 285 | 2.00 | 59 | 63.1 |

[a] Pounds of feed per pound of catalyst.
[b] 1.4% vanadium on activated alumina catalyst.
[c] Activated alumina catalyst.

The results in Table III indicate a vanadium removal of more than 80 percent by weight with the vanadium on alumina catalyst of the present invention, as compared

TABLE II

| | Process conditions | | | | Vanadium removal (percent) | |
|---|---|---|---|---|---|---|
| Example No. | Temp., ° F. | P.s.i.g. | LHSV | S.c.f. H₂ per bbl. | A | B |
| 9 | 825 | 1,800 | 2.0 | 5,000 | 84.2 | 100 |
| 10 | 825 | 1,800 | 2.0 | 5,000 | 75.4 | 75.4 |
| 11 | 825 | 1,800 | 2.0 | 5,000 | 82.5 | 82.5 |
| 12 | 650 | 1,000 | 0.2 | 2,000 | 49.1 | |
| 13 | 675 | 1,000 | 0.2 | 2,000 | 53.6 | 90.6 |
| 14 | 725 | 1,000 | 0.2 | 2,000 | | 95.6 |

NOTE: A=0.6% Ni, 1.0% Co, 8.0% Mo on Al₂O₃; B=1% V on Al₂O₃.

As seen from the results set forth in Table II, the vanadium-impregnated catalyst of the present invention permits equal or greater vanadium removal from crude oil than does the nickel-cobalt-molybdenum catalyst. The catalyst of the present invention permits the attainment of between 75 and 100 percent removal of vanadium, while the nickel-cobalt-molybdenum catalyst removes between about 50 and 84 percent of the vanadium from the hydrocarbon feedstock.

The following examples show that the performed vanadium-impregnated activated alumina catalyst of the present invention is much more active for removing vanadium from a crude oil than is the catalyst resulting from in situ deposition of vanadium from the crude on an initially vanadium-free activated alumina catalyst.

EXAMPLES 15 TO 21

A crude oil containing 160 p.p.m. of vanadium is contacted with a catalyst comprising 1.4 percent by weight vanadium on activated alumina at a temperature of 825° F., a pressure of 1800 p.s.i.g. and a liquid hourly space velocity of two. Hydrogen in an amount of 5000 standard cubic feet per barrel is employed as before.

with about 60 percent by weight for the activated alumina catalyst. Of particular moment is the fact that when the respective catalysts each contain equivalent amounts of vanadium, the preformed catalyst of the present invention removes approximately 20 percent by weight more of the vanadium from the crude oil than does the activated alumina, per se, catalyst. Also at equal throughputs, it is seen that the preformed catalyst contains a significantly greater amount of vanadium deposited from the oil than the activated alumina catalyst. Thus, it is seen that the unique catalyst of the present invention is much more active than a vanadium on alumina catalyst produced in situ by contact with the crude oil.

The following example illustrates the high degree of vanadium removal from contaminated crude oil under a relatively moderate temperature.

EXAMPLE 22

A crude oil containing 160 p.p.m. vanadium and 1.3 percent by weight sulfur is passed through a reactor containing a catalyst comprising one percent vanadium on activated alumina at a temperature of 725° F., a pressure of 1000 p.s.i.g. and a liquid hourly space velocity of 0.2.

Additionally, hydrogen is employed at the rate of 2000 standard cubic feet per barrel of oil treated.

The result of this run is set forth in Table IV.

TABLE IV

| | Crude feed | Product |
|---|---|---|
| Analysis: | | |
| V. p.p.m. | 160 | 6.4 |
| S, wt. percent | 1.33 | 0.96 |
| Bottoms, 670° F.+: | | |
| Wt. percent | 53.4 | 52.8 |
| Pentane Insolubles | 9.93 | 2.54 |
| Benzene Insolubles | 8.69 | 1.62 |
| Resins | 1.24 | 0.92 |

Upon viewing Table IV it is seen that 96 percent of the vanadium is removed from the crude oil at a temperature of only 725° F. In addition, the pentane insolubles in the 670° F.+ product are reduced from 9.93 to 2.54 weight percent.

The following example illustrates the empolyment of the catalyst of the present invention for removing vanadium from a crude oil feedstock under typical hydrodesulfurization process conditions.

EXAMPLE 23

A 50 percent reduced Kuwait crude oil is contacted with a one percent vanadium on activated alumina catalyst having a particle size of 8 to 14 mesh under a temperature in the range of 750° to 790° F. while employing a total pressure of 2500 p.s.i.g. A liquid hourly space velocity of 1.1 is used and hydrogen at a rate of 5000 standard cubic feet per barrel of oil having an 85 percent hydrogen content is utilized resulting in a hydrogen partial pressure of 2130 p.s.i.a. These conditions correspond to a hydrodesulfurization process in which a desulfurization level of about 75 to 90 percent is achieved using typical NiCoMo on alumina catalyst.

These conditions result in a removal of 73.5 percent of the vanadium, 28.6 percent of the nickel and 14.0 percent of the sulfur. The inspections on the reduced crude oil conversion products are set forth in Table V.

EXAMPLE 24

A 160 hour aging test is conducted employing a one percent vanadium on activated alumina catalyst. The catalyst is contacted with a crude oil containing 120 p.p.m. vanadium at a temperature of 825° F., a pressure of 1800 p.s.i.g., a liquid hourly space velocity of two, while employing 5000 standard cubic feet of hydrogen per barrel of oil contacted.

This treatment results in a vanadium removal of 90 to 95 percent by weight, an average nickel removal of about 60 percent by weight, and a sulfur removal of about 25 percent by weight.

EXAMPLE 25

Crude oil is contacted with a one percent vanadium on activated alumina catalyst at a temperature of 825° F., a pressure of 1800 p.s.i.g., and a liquid hourly space velocity of two. Hydrogen is employed at a rate of 5000 standard cubic feet per barrel of oil treated. The crude oil feedstock is contacted with the catalyst for a period of 354 hours.

During the first 168 hours, the vanadium removal from the crude oil drops from 95 percent to 90 percent. During this same period about 60 percent of the nickel and 26 percent of the sulfur are removed from the crude. During the next 140 hours vanadium removal averages about 80 percent, while nickel removal drops only four percent to 56 percent. Surprisingly, the sulfur removal increases from 26 to 36 percent during this time period.

Analysis of the product indicates that 85 percent of the vanadium and 50 percent of the nickel are removed over the 354 hour period.

EXAMPLE 26

A third aging run is made to determine the amount of vanadium which the catalyst of Examples 24 and 25 might ultimately be capable of holding. Conditions identical to those of Examples 25 are employed for this purpose.

TABLE V

| | Charge | Naphtha (IBP-380° F.) | Furnace oil (380° F.-640° F.) | Residue oil (640° F.+) |
|---|---|---|---|---|
| Weight percent (based on fresh feed) | | 1.5 | 7.9 | 90.6 |
| Inspections: | | | | |
| Gravity, ° API | 15.4 | 53.1 | 3.24 | 15.8 |
| Distillation (ASTM): | | | | |
| IBP, ° F | 713 (5%) | 191 | 356 | 713(5%) |
| EP | | 424 | 629 | |
| 10% by volume | 741 | 250 | 445 | 730 |
| 50% by volume | 957 | 299 | 541 | 922 |
| 90% by volume | 1,010 (60%) | 397 | 603 | 987(60%) |
| Sulfur, wt. percent | 3.84 | 0.36 | 2.20 | 3.44 |
| Nitrogen, wt. percent | 0.215 | 0.033 | 0.061 | 0.221 |
| Nickel, p.p.m. | 14 | | | 11 |
| Vanadium, p.p.m. | 51 | | | 15 |
| Viscosity, cs. at 100° F | 866.4 | | | 433.5 |
| Pour point, ° F | 30 | | 10 | 50 |
| Carbon residue, rams., wt. percent | 8.20 | | | 7.78 |
| Insolubles, wt. percent: | | | | |
| n-Pentane | 6.17 | | | 4.51 |
| Benzene | 2.31 | | | 3.15 |
| Resins | 3.86 | | | 1.36 |
| Aromatics, vol. percent | | 14.5 | 32.5 | |

As seen in Table V, 75 percent of the vanadium is removed under the conditions employed. Slightly better than 90 percent by weight yield of the product is desirably in the same boiling range as is the charge. Also, this 640° F.+ product has a lower viscosity, carbon residue and pentane insolubles content than does the charge stock in addition to containing less sulfur and metal. Accordingly, a much improved feedstock for hydrodesulfurization is provided by the process of the present invention.

The following examples illustrate that not only is the catalyst of the present invention highly active for removing vanadium from hydrocarbon oils but also has improved aging characteristics.

After about 50 days the catalyst has a vanadium level of 27 percent by weight and is still active for vanadium removal. Eighty-two perecnt of the vanadium is still being removed under the foregoing conditions at the end of 50 days. On the other hand, a nickel-cobalt-molybdenum catalyst generally becomes deactivated at a vanadium level of only about 18 percent.

The following examples illustrate the effect of catalyst age on vanadium removal from crude oils employing the catalyst of the present invention and prior catalysts.

EXAMPLES 27 to 29

Vanadium contaminated crude oil is contacted by the catalysts indicated in Table VI at a temperature of 825°

F., a pressure of 1800 p.s.i.g. and a liquid hourly space velocity of two. Hydrogen is employed at a rate of 5000 standard cubic feet per barrel of oil.

ployed at the rate of 5000 standard cubic feet per barrel of oil.

Liquid hourly space velocities of one and two are em-

TABLE VI

| Ex. No. | Catalyst | Throughput (lbs. feed/lb. catalyst) | Total V on aged catalyst (wt. percent) | V removal (percent) | | Desulfurization (percent) | |
|---|---|---|---|---|---|---|---|
| | | | | Initial | Aged | Initial | Aged |
| 27 | 1.4% V on activated alumina | 2,638 | 27 | 83.8 | 81.8 | 28.6 | 38.3 |
| | | 3,188 | 35 | | 80.2 | | 51.6 |
| 28 | NiCoMo a | 567 | 4.2 | 73.8 | 66.4 | 94.0 | 87.8 |
| 29 | Activated alumina | 285 | 2.0 | 60.6 | 63.1 | 17.3 | 30.8 | a 0.6 wt. percent Ni, 1.0% Co, 8.0% Mo on activated alumina.

The results shown in Table VI indicate that the nickel-cobalt-molybdenum catalyst loses substantial activity with ployed in the runs and the results are set forth in Table VII.

TABLE VII

| | Untreated crude feed | Example No. | | Pretreated crude feed | Example No. | |
|---|---|---|---|---|---|---|
| | | 30 | 31 | | 32 | 33 |
| LHSV | | 2 | 1 | | 2 | 1 |
| Product inspections: | | | | | | |
| Ni, p.p.m | 23 | 13 | 10 | 12 | 5.8 | 5.0 |
| V, p.p.m | 160 | 81 | 54 | 34 | 11 | 6.0 |
| S, wt. percent | 1.33 | 0.47 | 0.21 | 1.00 | 0.30 | 0.21 |
| N, wt. percent | 0.192 | 0.160 | 0.137 | 0.158 | 0.150 | 0.140 |
| Pentane insolubles, wt. percent | 4.58 | 3.05 | 2.39 | 3.50 | 1.63 | 1.29 |
| Denitrogenation, percent | | 15.6 | 29.6 | | 20.4 | 27.1 |
| Ni deposited on catalyst, p.p.m | | 10 | 13 | | 6.2 | 7 |
| V deposited on catalyst, p.p.m | | 79 | 106 | | 23 | 28 |
| Desulfurization, percent | | 64.7 | 84.2 | | 77.4 | 84.2 |
| Asphaltene conversion, percent | | 33.4 | 47.8 | | 64.4 | 71.8 | aging. The vanadium removal thereby drops from 73.8 percent to 66.4 percent after an oil throughput of only 567 pounds of oil per pound of catalyst, while the desulfurization activity drops from 94.0 percent to 87.8 percent. At this time, only 4.2 weight percent vanadium has been deposited on the catalyst.

In contrast thereto, the loss in vanadium removal activity is considerably less for the vanadium on alumina catalyst of the present invention and the desulfurization activity actually increases. After depositing approximately 27 percent vanadium on the catalyst after 2638 pounds of feed have contacted each pound of catalyst, the vanadium removal only drops from 83.8 percent to 81.8 percent and desulfurization increases from 28.6 percent to 38.3 percent. After further aging to 3188 throughputs by weight, which corresponds to about 35 percent vanadium on the catalyst, the vanadium removal for the present catalyst is still 80.2 percent. At this point, the product desulfurization increases to 51.6 percent.

A comparison of the activated alumina catalyst of Example 29 with the vanadium on alumina catalyst of Example 27 indicates that while the vanadium removal increases from 60.6 percent to 63.1 percent after in situ deposition of vanadium, the catalyst is still not nearly as effective as the present catalyst for removing vanadium.

The following examples illustrate the advantages which accrue to hydrodesulfurization processes that employ a change stock pretreated by contact with the catalyst of the present invention.

EXAMPLES 30 TO 33

Both untreated crude oil and crude oil that has been pretreated by the process of the present invention are hydrodesulfurized employing a nickel-cobalt-molybdenum hydrodesolfurization catalyst at a temperature of 790° F., a pressure of 2000 p.s.i.g. and a hydrogen rate of 10,000 standard cubic feet per barrel.

The pretreated crude oil had been contacted with a one percent vanadium on activated alumina catalyst at a temperature of 825° F., a pressure of 1800 p.s.i.g. and a liquid hourly space velocity of two. Hydrogen was em- As shown in Table VII, analysis of the products for the liquid hourly space velocity of two indicates that denitrogenation, desulfurization and asphaltene conversion were all higher for the pretreated feed. At the liquid hourly space velocity of 1.0 the nitrogen and sulfur contents of the feed were reduced to about the same level. However, the 71.8 percent asphaltene conversion for the pretreated feed is far greater than the 47.8 percent asphaltene conversion for the untreated feed. In addition, considerably less nickel and vanadium are deposited on the desulfurization catalyst when the pretreated feed is used. This significantly increases the life of the desulfurization catalyst for this use.

The vanadium on activated alumina catalyst of the present invention provides a highly suitable means of removing vanadium and nickel contaminants from hydrocarbons such as crude oil. As shown by the previous examples, the present catalyst is more effective for vanadium removal than prior catalysts including those which are relatively more expensive. Still further, the vanadium-impregnated activated alumina catalyst of the present invention is more active for the removal of vanadium from hydrocarbon oil than is the activated alumina catalyst which has vanadium deposited thereon in situ.

The invention is not limited to the embodiments shown and described herein. Many other modifications will occur to those skilled in the art and such modifications can be resorted to without departing from the spirit and scope of the invention. For example, the catalyst of the present invention can be utilized in the form of a slurry, a finely dispersed suspension, a fixed bed or a fluidized bed. Although the present invention has been illustrated above in connection with reducing the contamination to a hydrodesulfurization process, it is not limited to the pretreatment of such feeds. Thus, the invention can be used to demetalize and remove vanadium and nickel from a feedstock to any catalytic process in which the catalyst is adversely affected by vanadium, such as catalytic cracking, catalytic hydrogenation, hydroforming, hydrofining, hydrofinishing, platforming, or the like. Also, the expression "petroleum oil" or "hydrocarbon oil" is employed herein in its usual sense to define oils that are composed chiefly of components containing mostly carbon and hydrogen of which petroleum oils and various fractions derived therefrom are examples. This expression is not intended to exclude oils which contain minor proportions of elements other than carbon or hydrogen, such as sulfur, oxygen, nitrogen and the like, as is the normal case with petroleum oils and various fractions derived therefrom. The term "preformed" catalyst as employed in connection with the present catalyst is intended to include a catalyst that is prepared by the addition of vanadium to an alumina as described prior to its placement on stream. Only such limitations should be imposed in the present invention as are indicated in the appended claims.

We claim:

1. A process for the purification of a hydrocarbon stream containing vanadium which comprises contacting said stream in the presence of hydrogen with a preformed catalyst consisting essentially of vanadium oxide on activated alumina.

2. The process of claim 1 wherein the catalyst comprises between about 0.01 and about 10 percent vanadium.

3. The process of claim 2 wherein the catalyst comprises between about one percent and about three percent vanadium.

4. The process of claim 1 wherein the hydrocarbon is contacted with the catalyst at a temperature in the range of between about 700° and about 1000 F.

5. The process of claim 4 wherein hydrogen is employed at a rate between about 2000 and about 5000 standard cubic feet per barrel of hydrocarbon treated.

6. The process of claim 1 wherein the activated alumina comprises a mixture of gamma and eta alumina.

7. The process for hydrodesulfurization of hydrocarbon oil which comprises contacting said oil in the presence of hydrogen with a preformed catalyst consisting essentially of vanadium oxide on activated alumina for removal of vanadium and subjecting the vanadium-depleted oil to a hydrodesulfurization treatment.

8. The process of claim 7 wherein the vanadium removal treatment and the hydrodesulfurization treatment are conducted under substantially the same conditions.

References Cited

UNITED STATES PATENTS

| | | | |
|---|---|---|---|
| 2,891,005 | 6/1959 | Heinrich | 208—253 |
| 3,207,703 | 9/1965 | Innes et al. | 252—455 |
| 3,297,589 | 1/1967 | Gleim | 208—251 |
| 3,383,306 | 5/1968 | Rogers et al. | 208—254 |

OTHER REFERENCES

"Chemical Refining of Petroleum," Kalichevsky, p. 34, New York, Reinhold Pub.

DELBERT E. GANTZ, Primary Examiner

J. M. NELSON, Assistant Examiner

U.S. Cl. X.R.

208—89